United States Patent Office 3,462,365
Patented Aug. 19, 1969

3,462,365
SCALE INHIBITING COMPOUNDS
Paul G. Vogelsang, Jr., Houston, Tex., assignor to Nalco Chemical Company, Chicago, Ill., a corporation of Delaware
No Drawing. Filed June 23, 1966, Ser. No. 559,723
Int. Cl. C02b 5/06
U.S. Cl. 210—58          9 Claims

ABSTRACT OF THE DISCLOSURE

Certain phosphate esters of polyols containing one or more 2-hydroxyethyl groups and one or both of the groups

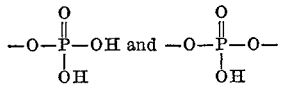

and salts thereof, are used to inhibit scale deposits by adding them to water containing containing scale-forming chemicals.

---

This invention in general pertains to polyoxyalkylated compounds which are phosphated by the reaction thereof with phosphorus pentoxide and to uses thereof as scale inhibitors.

The preferred compounds of the invention are either oxythylated or oxypropylated-terminally oxythylated polyhydric compounds such as polyoxyethylated glycerol, sorbitol, mannitol or trimethylolpropane. Other compounds which may be either oxyethylated or oxypropylated-terminally oxyethylated for the purposes of this invention include erythritol, arabitol, xylitol, quercitol, inositol, and mono-, di-, or tri-pentaerythritol.

The polyoxyalkylated polyhydric compounds are phosphated by reaction with phosphorus pentoxide at elevated temperature in the order of about 95–150° C. The reaction time is preferably at least about 30 minutes. The reaction may be conducted longer, however, e.g., up to 3–5 hours, to assure complete reaction. If desired, a catalyst such as $BF_3$ etherate complex may be used.

The resultant reaction product may be used as is, or it may be converted to the alkali metal salt by partial to complete neutralization with an alkali metal base such as potassium or sodium hydroxide, potassium or sodium carbonate, and the like.

The polyhydroxy compounds contain at least one, and preferably an average of at least about two, 2-hydroxyethyl groups ($-CH_2CH_2OH$) provided by the oxyethylation. The primary hydroxyl groups thereof are more effective than the secondary hydroxyl groups which would be provided by oxpropylation

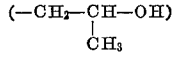

However, oxypropylation may be used if the oxypropylated product is then oxylated to provide terminal 2-hydroxyethyl groups.

The compositions of the invention comprise a phosphated polyhydroxy composition derived by the reaction of phosphorus pentoxide and a polyol composition of the formula

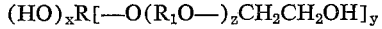

wherein R is a saturated, hydrocarbon radical having 3–6 carbon atoms, $R_1$ is a member selected from the group consisting of $-CH_2CH_2-$ and

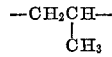

$x$ is a number average in the range of 0–5, inclusive, $y$ is a number average in the range of 1–6, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxy ethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of

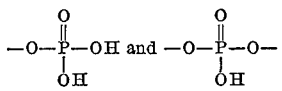

Also, the invention embraces the alkali metal salts thereof derived by the partial to complete neutralization of the phosphate ester groups with an alkali metal base.

Preferred embodiments include those in which said polyol composition is derived by oxyethylation of glycerol with 1.5 to 2.5 mols of ethylene oxide per mol of glycerol; those in which said polyol composition is derived by the oxyethylation of mannitol with about 2–20 mols of ethylene oxide per mol of mannitol; those in which said polyols are derived by the oxyethylation of sorbitol with about 2–20 mols of ethylene oxide per mol of sorbitol; and those in which said polyol is derived by the oxyethylation of trimethylolpropane with 1.5 to 2.5 mols of ethylene oxide per mol of trimethylolpropane.

The invention further embraces a process for preventing hardness scale deposits on metal surfaces in contact with hard water containing hardness scale-forming ions which comprises contacting said metal surfaces with said hard water while maintaining therein a hardness-ion-precipitation-preventing quantity in the order of 0.5–100 parts per million of a phosphated polyhydroxy composition derived by the reaction of phosphorus pentoxide and a polyol composition of the formula

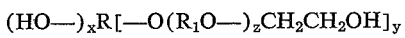

wherein R is a saturated hydrocarbon radical having 3–6 carbon atoms, $R_1$ is a member selceted from the group consisting of $-CH_2CH_2-$ and

$x$ is a number average in the range of 0–5, inclusive, $y$ is a number average in the range of 1–6, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxy ethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of

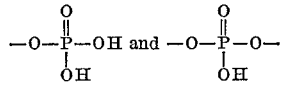

The process also includes use of alkali metal salts derived by partial to complete neutralization of the phosphate ester groups with an alkali metal base.

The invention is particularly suitable for scale prevention by natural brines on ferrous metal walls and other surfaces in oil producing and water flood systems.

Inorganic polyphosphates have long been the most effective and economical sequestering agents used for the prevention of alkaline deposits in both oil producing and water flood systems. However, due to the problems encountered in feeding inorganic polyphosphates and their incompatibility with many waters, a need for a liquid organic phosphate with good solubility in waters containing hardness ions has become increasingly evident. For this reason, a liquid product with good solubility in produced waters and having the effectiveness and low treating cost of organic polyphosphates is needed.

The invention has utility in the prevention of similar scale deposits occurring in closed and once-through cooling systems where hard water is employed.

The compounds may also have utility in boiler feed waters and in waters charged to certain desalinization equipment where scale deposition is a problem.

The invention may also be used in the prevention of scale deposits in certain effluent and disposal waters, particularly where other materials used in the prevention of such deposits may constitute a pollution problem.

The following are examples of preferred embodiments of the invention wherein the parts are by weight unless otherwise indicated.

EXAMPLE 1

Glycerine and finely ground potassium hydroxide are charged into an oxyalkylation reactor and are heated to 150° C. while purging the reactor with natural gas. Ethylene oxide is added slowly at 150–160° C. until the weight amount of added ethylene oxide equals the weight of the glycerine. The reactor contents are recycled for an additional hour after all the ethylene oxide is added to assure essentially complete oxyalkylation. The weight of the added KOH was about 0.1% of the total weight of glycerine and ethylene oxide.

The phosphating procedure comprises charging 550 parts of the above polyoxyethylated glycerine and 115 parts of n-propanol, the latter as a viscosity control agent, into a vessel free from moisture and oily or other foreign material. The charge is heated to 50° C., whereupon 456 parts of phosphorus pentoxide is added in small amounts whereby the exothermic reaction is controlled by the rate of addition and by cooling to maintain a temperature of 80–90° C. When 360 parts of $P_2O_5$ has been added, the temperature is allowed to increase to the range of 130–135° C. for about 2 hours, or less if the clarity of the reaction mass indicates complete reaction.

With the reactor on full cooling, 1830 parts of tap water is added, slowly in the initial phase of water addition. Cooling is continued, and when the temperature is below 60° C., 6 parts of sodium molybdate (a corrosion inhibitor) and 240 parts of flake caustic are added. The temperature is maintained below 90° C. during flake caustic addition.

Then 20 parts of a sulfonated tannin, which is commercially available under the trademark Rayflo, 286 parts of n-propanol and 215 parts of methanol are added and the mass is stirred until uniform. The final pH is adjusted to a value between 4.0 and 4.5.

Examples of further oxyethylated polyhydric compounds which can be obtained by the oxyalkylation procedure of Example 1 and can be phosphated as therein described are as follows:

TABLE 1.—OXYALKYLATED COMPOUNDS

| Example | Polyhydric compound Name | Parts | Parts ethylene oxide |
|---|---|---|---|
| 2 | Glycerine | 410 | 390 |
| 3 | do | 276 | 524 |
| 4 | do | 234 | 670 |
| 5 | do | 590 | 111 |
| 6 | do | 320 | 920 |
| 7 [1] | Trimethylolpropane | 930 | 6t3 |
| 8 | Sorbitol | 250 | 550 |
| 9 | do | 220 | 960 |
| 10 [2] | Mannitol | 266 | 113 |
| 11 | do | 234 | 234 |
| 12 | Glycerine | 200 | 200 |

[1] Catalyst—$BF_3$ etherate complex.  [2] Solvent—dioxane.

TABLE 2.—PHOSPHATED OXYALKYLATED COMPOUNDS

| Example | Oxyalkylated compound Ex. | Parts | Parts $P_2O_5$ | Reaction time after $P_2O_5$ addition, hr. | Temp., °C. | Parts water added | Parts flake caustic | Parts alkanol added after Rxn. |
|---|---|---|---|---|---|---|---|---|
| 13 | 2 | 200 | 120 | 3 | 140 | 320 | 0 | 0 |
| 14 | 2 | 200 | 120 | 3 | 140 | 383 | 32 | [1] 32 |
| 15 | 2 | 200 | 60 | 0.75 | 100–110 | 335 | 45 | 0 |
| 16 | 2 | 200 | [2] 60 | 0.50–0.75 | 100–110 | 335 | 45 | 0 |
| 17 | 2 | 200 | [2] 100 | | | 305 | 60 | 0 |
| 18 | 2 | 200 | [2] 100 | | | 360 | 70 | 0 |
| 19 | 2 | 200 | [2] 120 | | | 600 | 60 | 0 |
| 20 | 6 | 300 | [3] 100 | | | 560 | 0 | 0 |
| 21 | 2 | 150 | [2] 60 | 0.50 | 190 | 390 | [4] | 0 |
| 22 | 2 | 150 | [5] 120 | 2–3 | 120 | 510 | [4] | 0 |
| 23 | 6 | 150 | [5] 140 | 1 | 100 | 470 | [4] | 0 |
| 24 | 2 | 150 | 90 | 0.50 | 185 | 450 | [4] | 0 |
| 25 | 2 | 150 | [8] 90 | 0.50 | 180 | 450 | [4] | 0 |
| 26 | 12 | 150 | [6] 130 | 0.50 | 150 | 540 | [4] | [7] 20 |
| 27 | 12 | 150 | [6] 130 | 0.50 | 185 | 540 | [4] | [7] 20 |
| 28 | 12 | 150 | [2] 70 | ([8]) | 120 | 410 | [4] | [7] 50 |
| 29 | 12 | 150 | [9] 90 | 0.5 | 100–110 | 495 | [4] | 0 |
| 30 | 7 | 930 | 50 | 5 | 100 | 200 | 0 | 0 |
| 31 | 7 | 930 | 90 | 5 | 100 | 200 | 0 | 0 |
| 32 | 8 | 200 | 10 | 3 | 90–100 | 200 | 0 | 0 |
| 33 | 9 | 200 | 20 | 3 | 90–100 | 200 | 0 | 0 |
| 34 | 8 | 200 | [10] 110 | 3 | 100 | 310 | 0 | 0 |
| 35 | 10 | 200 | 90 | 3 | 108 | 290 | 0 | 0 |
| 36 | 11 | 200 | [2] 90 | 3 | 108 | 290 | 0 | 0 |
| 37 | 11 | 200 | 90 | 3 | 108 | 290 | 0 | 0 |

[1] Methanol.
[2] 2.5 cc. $BF_3$.
[3] 3 cc. $BF_3$.
[4] Sufficient to neutralize.
[5] 50 parts m-propanol added before $P_2O_5$.
[6] 30 parts n-propanol added before $P_2O_5$.
[7] n-Propanol.
[8] To completion.
[9] 20 parts dioxane added before $P_2O_5$.
[10] 5 parts flake caustic soda added with $P_2O_5$.

EXAMPLE 38

In a reaction vessel equipped with a stirrer and cooling means, 150 parts of the oxyethylated glycerol of Example 2 and 30 parts of n-propanol are held at a temperature below 125–130° C. while adding 130 parts $P_2O_5$. When the reaction mass becomes clear, it is cooled. To the cooled product is added 20 parts n-propanol and 540 parts water, and then the product is neutralized with flake caustic.

EXAMPLE 39

In a reaction vessel equipped with cooling means and a stirrer, 150 parts of the oxyethylated glycerol of Example 12 and 150 parts of dioxane, as solvent, are held by cooling at a temperature below 100° C. while adding 90 parts $P_2O_5$. The temperature is then raised and 127 parts dioxane is distilled off. After cooling, the reaction product is diluted with 525 parts water and is neutralized with flake caustic soda.

EXAMPLE 40

The solution of Example 39 (880 parts) is blended with 100 parts methanol and 20 parts of a sulfonated tannin as described in Example 38.

Lower alkanols, particularly n-propanol, may be present in the $P_2O_5$ reaction as viscosity control agents.

Lower alkanol phosphates which form by the reaction of the alkanol and $P_2O_5$ are not particularly active as scale inhibitors.

On the other hand, phosphate esters and/or alkali metal salts thereof of oxyethylated higher alkanols having 4–12 carbons can be used in the invention in admixture with the heretofore described phosphate esters of oxyalkylated polyhydric compounds at a weight ratio of 0.5–5:1, respectively. The oxyethylated alkanols contain about 2–20 mols of oxyethylene groups per mol of alkanol and have the general formula $$RO-(CH_2CH_2O)_{2-20}H$$

wherein R is a straight chain or branch chain alkyl group of 4–12 carbons. Mixtures of two or more alkanols with 4–12 carbons are also contemplated by the invention. The oxyethylated higher alkanols may be reacted with $P_2O_5$ separately from the $P_2O_5$ reaction of the oxyalkylated polyhydric compounds aforedescribed and then blended with the latter reaction product, or the oxyalkylated polyhydric compounds and the oxyethylated higher alkanols may be mixed first and then reacted together with the $P_2O_5$.

The following is a specific example of this aspect of the invention.

EXAMPLE 41

In a reaction vessel equipped with a stirrer, 100 parts of the oxyalkylated glycerine of Example 2, 200 parts of oxyethylated high boiling alcohols and 90 parts of $P_2O_5$ are heated and reacted at 185–190° C. The reaction mixture is refluxed for 15 minutes. After cooling, the reaction product is diluted with 390 parts of water and is neutralized with caustic soda flakes.

The specific mixture in this example was a heavy alcohol mixture called "butanol bottoms" and comprised n-butanol, 3%; $C_5$ alcohols, .5%; $C_6$ alcohols, 10%; $C_7$ alcohols, 23%; $C_8$ alcohols, 45%; and $C_9$–$C_{12}$ alcohols, 14%. The alcohols were mostly primary, branch chain alkanols. They were oxyethylated at 120–160° C. with 345 parts by weight of ethylene oxide per 130 parts of the heavy alcohol mixture with 0.1% by weight of finely ground potassium hydroxide as the alkaline catalyst. The ethylene oxide addition took about one hour at 120–160° C. and was followed by a one hour recycle period at 160° C.

The compositions of the invention are especially effective in the inhibition of scaling on metal surfaces by calcium sulfate, barium sulfate, and calcium carbonate. They are useful in the oil production industry to prevent deposits of these scale-producing compounds on metal surfaces of pumps, pipes, valves, tanks, and the like when waters containing the scale-producing compounds (or precursors thereof, e.g., calcium bicarbonate) are treated in the concentrations aforesaid, i.e., 0.5 to 100 parts per million. Places where scale buildup is most likely to become troublesome are those in the liquid handling systems wherein there is a change in fluid pressure, a change in fluid temperature, or a change in fluid flow rate.

The invention may be used in waterflood systems used to inject water into subterranean formations, wherein the water is brackish or is a brine conducive to scale formation on metal surfaces of the waterflood system. Typical brines encountered in waterflood operations, wherein water is drawn from sources available at or near the waterflood site, are:

|  | Brine A | Brine B |
|---|---|---|
| Chloride (NaCl) _____ mg./l | 49,000 | 28,000 |
| Total Hardness (CaCO₃) _____ mg./l | 5,300 | 3,400 |
| Calcium (CaCO₃) _____ mg./l | 4,900 | 1,600 |
| Alkalinity P(CaCO₃) _____ mg./l | 120 | 80 |
| Alkalinity M(CaCO₃) _____ mg./l | 1,050 | 130 |
| Sulfate (NaSO₄) _____ mg./l | 0 | 4,750 |
| pH _____ | 7.8 | 8.3 |

The foregoing brines may be treated with about 15–20 p.p.m. of the composition of Example 1 or 5–10 p.p.m. of the composition of Example 38 for Brine A and with 10–15 p.p.m. and 20–25 p.p.m., respectively, for Brine B for effective scale control.

In cooling waters of closed cooling systems, wherein the cooling water is a typical municipal tap water, maintenance of dosage levels of 15–30 p.p.m. are typical, although higher levels up to about 100 p.p.m. may be needed or desired in particular cases, for the compositions of Examples 1 and 38.

In low pressure boilers, dosage levels in the range of 50–250 p.p.m. may be employed, a typical level being about 80–100 p.p.m., for the compositions of Examples 1 and 38.

The compositions of the invention are useful in a number of areas where scaling of metal surfaces, particularly ferrous metal surfaces, by barium sulfate, calcium sulfate and/or calcium carbonate is a problem. By control of scale formation, breakdowns, maintenance, cleaning and repairs caused or necessitated by scale formations can be minimized. For example, the composition of Example 1 is effective in preventing barium sulfate scale in waterflood systems. In oil producing wells which produce oil and brine, bad scaling by barium sulfate or calcium carbonate can cause the wells to be pulled every two or three weeks. By batch treatment or continuous treatment thereof with the composition of Example 1 or 38, the well will rarely need to be pulled for reasons of scaling.

So much of this application as relates to a phosphated polyhydroxy composition consisting essentially of phosphate esters of oxyethylated higher alkanols and polyols and alkali metal salts of said esters and their use for inhibiting scale deposits are claimed in application Ser. No. 584,672, filed Oct. 6, 1966.

Claims directed toward compounds which were required to be divided from the original application are covered in application Ser. No. 720,334, filed Apr. 10, 1968.

The invention is hereby claimed as follows:

1. A process for preventing scale deposits of at least one of barium sulfate, calcium sulfate, and calcium carbonate on metal surfaces in contact with water containing said scale-forming chemicals which comprises contacting said metal surfaces with said water while maintaining therein about 0.5–100 parts per million of a phosphated polyhydroxy composition derived by the reaction of phosphorus pentoxide and a polyol composition of the formula $$(HO-)_xR[-O(R_1O-)_zCH_2CH_2OH]_y$$

wherein R is a saturated, hydrocarbon radical having 3–6 carbon atoms, $R_1$ is a member selected from the group consisting of $-CH_2CH_2-$ and $$-CH_2CH- \\ \phantom{-CH_2}|\phantom{H-} \\ \phantom{-CH_2}CH_3$$

$x$ is a number average in the range of 0–5, inclusive, $y$ is a number average in the range of 1–6, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxy ethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of $$-O-\overset{\overset{O}{\|}}{\underset{OH}{P}}-OH \quad \text{and} \quad -O-\overset{\overset{O}{\|}}{\underset{OH}{P}}-O-$$

2. A process as claimed in claim 1 wherein said hard water is a natural water or brine and said phosphated polyhydroxy composition is an alkali metal salt derived by the partial to complete neutralization of said phosphate ester groups of a composition as claimed in claim 1 with an alkali metal base.

3. A process as claimed in claim 2 wherein said polyol composition is derived by oxyethylation of glycerol with 1.5 to 2.5 mols of ethylene oxide per mol of glycerol.

4. A process as claimed in claim 2 wherein said polyol composition is derived by oxyethylation of mannitol with about 2–20 mols of ethylene oxide per mol of mannitol.

5. A process as claimed in claim 2 wherein said polyol composition is derived by oxyethylation of sorbitol with about 2–20 mols of ethylene oxide per mol of sorbitol.

6. A process as claimed in claim 2 wherein said polyol composition is derived by oxyethylation of trimethylolpropane with 1.5 to 2.5 mols of ethylene oxide per mol of trimethylolpropane.

7. A process as claimed in claim 1 in which said phosphated polyhydroxy composition is added to a water used for cooling.

8. A process as claimed in claim 1 in which said phosphated polyhydroxy composition is added to a boiler water.

9. A process as claimed in claim 1 in which said phosphated polyhydroxy composition is added to water used in a waterflood system for oil wells.

References Cited

UNITED STATES PATENTS

| | | | |
|---|---|---|---|
| 3,004,056 | 10/1961 | Nunn et al. | 252—89 |
| 3,130,152 | 4/1964 | Fuchs | 210—57 |
| 3,263,003 | 7/1966 | Friedman | 260—953 |
| 3,309,427 | 3/1967 | Zech et al. | 260—953 |
| 3,346,670 | 10/1967 | Papalos | 260—929 |

LEON D. ROSDOL, Primary Examiner

W. SCHULZ, Assistant Examiner

U.S. Cl. X.R.

210—59; 252—89, 180; 260—929, 953